(12) United States Patent
Vicente et al.

(10) Patent No.: US 8,014,115 B2
(45) Date of Patent: Sep. 6, 2011

(54) CIRCUIT BREAKER HAVING SEPARATE RESTRAINED AND UNRESTRAINED ZONE SELECTIVE INTERLOCK SETTING CAPABILITY

(75) Inventors: Nataniel Barbosa Vicente, Prospect, KY (US); Mark Fredrick Culler, Prospect, KY (US); Brian Patrick Lenhart, Jr., Louisville, KY (US); Marcelo Esteban Valdes, Burlington, CT (US)

(73) Assignee: General Electric Company, Schenectady, NY (US)

( * ) Notice: Subject to any disclaimer, the term of this patent is extended or adjusted under 35 U.S.C. 154(b) by 681 days.

(21) Appl. No.: 12/103,283

(22) Filed: Apr. 15, 2008

(65) Prior Publication Data

US 2009/0257157 A1    Oct. 15, 2009

(51) Int. Cl.
*H02H 3/08* (2006.01)

(52) U.S. Cl. .......................................... 361/93.1; 361/96

(58) Field of Classification Search ........................ None
See application file for complete search history.

(56) References Cited

U.S. PATENT DOCUMENTS

| | | | | |
|---|---|---|---|---|
| 4,266,259 | A | * | 5/1981 | Howell ............................ 361/97 |
| 5,872,722 | A | * | 2/1999 | Oravetz et al. ................. 700/292 |
| 6,297,939 | B1 | | 10/2001 | Bilac et al. |
| 6,633,474 | B1 | * | 10/2003 | Boudaud .......................... 361/95 |

* cited by examiner

*Primary Examiner* — Jared J Fureman
*Assistant Examiner* — Terrence R Willoughby
(74) *Attorney, Agent, or Firm* — Cantor Colburn LLP

(57) ABSTRACT

A circuit breaker system and method having zone selective interlock features with separate restrained and unrestrained setting capability is provided. The system and method include the transmission of a selective interlock signal from a downstream circuit breaker to an upstream circuit breaker in the event of a fault condition. The upstream circuit breaker upon receipt of this signal changes the tripping response of the second circuit breaker to a restrained mode. The circuit breakers include features enabling the user to modify and adjust both the restrained and unrestrained trip curves associated with both the restrained and unrestrained modes of operation.

19 Claims, 9 Drawing Sheets

CIRCUIT BREAKER HAVING SEPARATE RESTRAINED AND UNRESTRAINED ZONE SELECTIVE INTERLOCK SETTING CAPABILITY

BACKGROUND OF THE INVENTION

The subject matter disclosed herein relates to a system for providing zone selective interlock between circuit breakers in an electrical distribution system. In particular, the subject matter disclosed herein relates to a system for zone selective interlock between a downstream circuit breaker and an upstream circuit breaker during instantaneous trip conditions.

Air circuit breakers are commonly used in electrical distribution systems. A typical air circuit breaker ("ACB") comprises an assembly of components for connecting an electrical power source to a consumer of electrical power called a load. The electric circuit the circuit breaker is connected to is referred to herein as the protected electric circuit. The components are referred to as a main contact assembly. In this assembly, a main contact is typically either opened, interrupting a path for power to travel from the source to the load, or closed, providing a path for power to travel from the source to the load. The ACB will further include devices and sensors, referred to as a trip unit, capable of sensing the current flowing through to the protected circuit and comparing the magnitude of the sensed current against predetermined thresholds. The trip unit's thresholds and current magnitude trip characteristics is displayed in a graphical form, commonly referred to as a "trip curve," which indicates to a user how long the trip unit will take to trip under any given overload condition. Upon detection of an overcurrent fault condition on the protected circuit outside of the trip curve parameters, the trip unit activates the mechanical linkages that cause the main contact assembly to open.

Downstream from the ACB, other ACBs or, one, or more smaller capacity circuit breakers, sometimes referred to as molded case circuit breakers ("MCCB's"), may be installed to further protect and isolate portions of the electrical distribution system. The MCCB's are available in multiple capacities and are often arranged in tiers or levels, with multiple MCCB's being arranged within each tier. The MCCB's, similar to the air circuit breaker, include a main contact assembly that is opened and closed via a mechanical linkage assembly. A trip unit associated with each MCCB senses current flowing through that portion of the protected circuit. Similar to the ACB, the MCCB utilizes trip curves to determine when a given condition is outside the desired parameters.

Since both the ACB and the MCCB react to fault conditions, circumstances may arise where an electrical fault causes both the ACB and MCCB to open their respective contact assemblies. In general, it is desirable to have the circuit breaker closest to the fault interrupt the fault current, commonly referred to as tripping, such that the smallest portion of the protected circuit, closest to the fault is interrupted. The portion of the circuit bounded by its source circuit breakers and any circuit breakers exiting the circuit is called the zone of protection for the source circuit breakers. If the zone becomes faulted it is called the faulted zone. Interrupting the fault current close to the fault prevents, or at least minimizes the amount of disruption on other operations connected to other protected circuits. To avoid having the upstream ACB or an upstream MCCB trip, the system of circuit breakers on the protected circuit is coordinated. Through selective coordination, the trip curves of each circuit breaker are adjusted to allow the downstream circuit breaker the opportunity to trip first without jeopardizing the functionality of the circuit breaker system above the faulted zone.

Circuit breaker systems may also incorporate a zone selective interlock ("ZSI") arrangement. In a ZSI system, the downstream circuit breaker communicates with an upstream circuit breaker when a fault is detected. The upstream circuit breaker then changes its tripping response to allow the downstream circuit breaker to clear the fault. Thus, the upstream circuit breakers have two modes of operation. These modes are commonly referred to as "restrained" and "unrestrained" operation. In an unrestrained mode, the circuit breaker operates under the fastest default trip curve and is not modifiable by the operator. Due to timing issues in the communications between the circuit breakers, the fastest trip curve is used to ensure adequate protection. When the communication of a fault is received by the upstream circuit breaker, the upstream circuit breaker switches to the restrained mode of operation. In the restrained mode, the upstream circuit breaker will shift the trip curve to a curve set by the operator, this has the effect of delaying the tripping response of the upstream circuit breaker. The switching of the trip curve allows the upstream circuit breaker to perform its function while also allowing the downstream circuit breaker to clear the fault. The zone selective interlock system thus allows the operator to minimize the impact of the fault without jeopardizing the functionality of the circuit breaker system.

While existing circuit breakers coordinated using cascaded time delays are suitable for their intended purposes, there still remains a need for improvements particularly regarding the ability of the operator to define the trip curves and the coordination of the circuit breakers when operating in ZSI restrained modes.

SUMMARY OF THE INVENTION

A method of operating a circuit breaker system is provided. The method includes defining a first user defined trip curve for a first circuit breaker. The first trip curve includes an unrestrained short time threshold, an unrestrained $I^2t$ region having a slope, a time delay region, and an unrestrained instantaneous threshold. A second user defined trip curve is defined for the first circuit breaker where the second trip curve includes a restrained $I^2t$ region having a slope, and a time delay. The slope of said user defined second trip curve restrained $I^2t$ region is modified. An interlock signal is then received at said first circuit breaker. Finally, the trip response of the first circuit breaker is changed from said first trip curve to the second trip curve in response to receiving the interlock signal.

A circuit breaker is also provided having a current sensor. A trip unit is operably coupled to the current sensor. The trip unit is further responsive to executable computer instructions to operate in an unrestricted mode and a restricted mode in response to an interlock signal. A user interface is operably coupled to the trip unit. Wherein the trip unit is further responsive to executable computer instructions to a first signal from the user interface to create a first user defined trip curve for use with the unrestricted mode and a second user defined trip curve for use with the restricted mode.

A circuit breaker system is further provided having a first and second circuit breaker. The first circuit breaker includes a first trip unit. The first trip unit is responsive to executable computer instructions to operate in either an unrestricted mode or a restricted mode. The unrestricted mode includes a first trip curve and the restricted mode includes a second trip curve. The first circuit breaker also includes a first current sensor electrically coupled to the first trip unit. Further, a first user interface is operably coupled to the first trip unit, wherein the first trip unit is response to executable computer instructions to modify parameters of the first trip curve in response to a first signal from the first user interface.

The second circuit breaker is electrically coupled to receive electrical power from the first circuit breaker. The second circuit breaker a second trip unit, coupled for communication to the first trip unit. The second trip unit is responsive to executable computer instructions to operate in either a restricted mode or an unrestricted mode, wherein the unrestricted mode includes a third trip curve and the restricted mode includes a fourth trip curve. A second current sensor is electrically coupled to the second trip unit. Further, a second user interface is operably coupled to said second trip unit, wherein the second trip unit is response to executable computer instructions to modify parameters of the third trip curve in response to a second signal from the second user interface.

BRIEF DESCRIPTION OF THE DRAWINGS

Referring now to the drawings, which are meant to be exemplary and not limiting, and wherein like elements are numbered alike.

DETAILED DESCRIPTION

Figure 1:
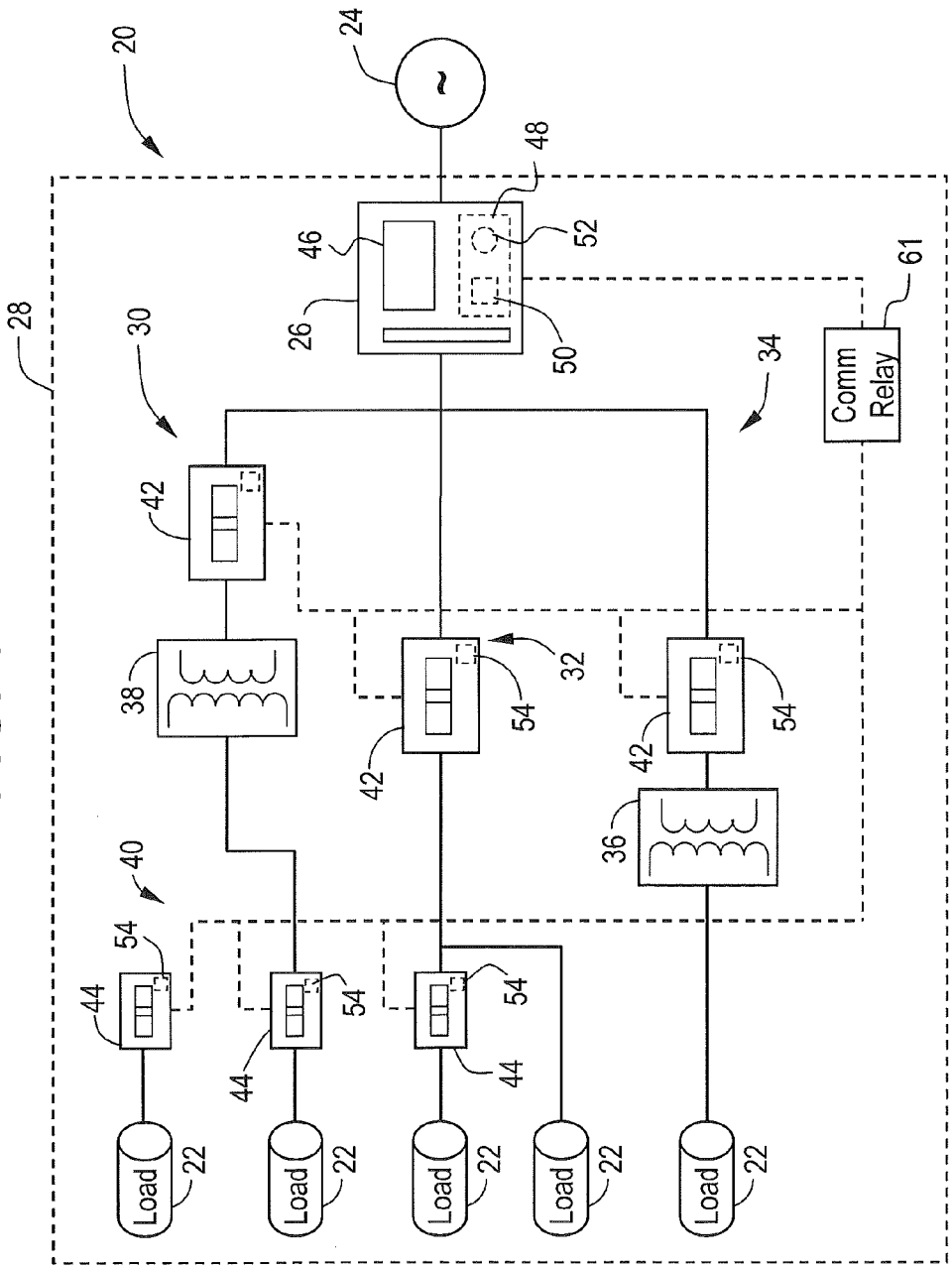
FIG. 1 is a schematic illustration of a protected electric circuit having a system of circuit breakers in accordance with an exemplary embodiment.

FIG. 1 illustrates a system of circuit breakers 20 connected to a protected electrical circuit serving loads 22 within a facility 28. An electrical power source 24, such as a utility electrical grid for example, is connected to a circuit breaker 26. Circuit breaker 26 is typically located at a service entrance for the facility 28. In a large facility, such as in the exemplary embodiment, the circuit breaker 26 is an air circuit breaker ("ACB") having the capability and capacity for connecting to three electrical phases from the power source 24 and distributing the power to different sub-circuits within the facility. The electrical loads 22 may be any type of load, including but not limited to lighting systems, process motors, data centers, heating and ventilation systems and the like.

Downstream from ACB 26, the protected circuit branches into multiple sub-circuits 30, 32, 34. These sub-circuits may include additional electrical distribution and control equipment such as transformers 36, 38 that adapt the electrical characteristics of the supplied electrical power to have the characteristics needed by the respective loads. The transformer 38 may step-down the voltage to 120V for use by a lighting circuit for example. Each of the sub-circuits 30, 32, 34 may be further sub-divided into even more refined low tier sub-circuits 40. The sub-circuits may include further electrical control devices, including but not limited to fuses and contactors for example. It should be appreciated the number of sub-circuits and tiers of sub-circuits may be numerous and that the illustration of FIG. 1 is intended to be exemplary and not limiting.

Each tier of sub-circuits generally initiates with a circuit breaker, such as circuit breaker 42 or circuit breaker 44 for example. Each circuit breaker 44 is electrically connected to receive electrical power from the ACB 26. In the exemplary embodiment, these lower tier circuit breakers 42, 44 are molded case circuit breakers ("MCCB"). Each MCCB may be either single phase or multiphase depending on the requirements of the downstream load 22 connected the MCCB.

The ACB 26 includes a user interface 46 that may include a display and an input device, such as a keyboard. The display may be an LED (light-emitting diode) display, an LCD (liquid-crystal diode) display, a CRT (cathode ray tube) display, or the like. The user interface 46 allows the operator to observe the operating conditions and state of the ACB 26, such as the voltage and current received from the power source 24 for example, or the position of the contacts for example. The user interface 46 further allows the operator to change various operating parameters of the ACB 26. As will be discussed in more detail below, the user interface 46 allows the operator to adjust a user defined trip curves for both restrained mode and unrestrained modes of operation, define pick up thresholds, identify that zone selective operation is desired and what type of protection shall be interlocked, and delay timing to provide coordination and a zone selective interlock with the circuit breakers 42, 44 in the lower tier circuits.

The ACB 26 further includes a trip unit 48 having a processor 50 and a current sensor system 52. The trip unit is operably coupled to receive instructions from the user interface 46 and activate the ACB's operating mechanism (not shown). Alternatively, the processor 50 may also accept instructions through user interface, or through other means such as but not limited to electronic data card, voice activation means, manually-operable selection and control means, radiated wavelength and electronic or electrical transfer.

Figure 4:
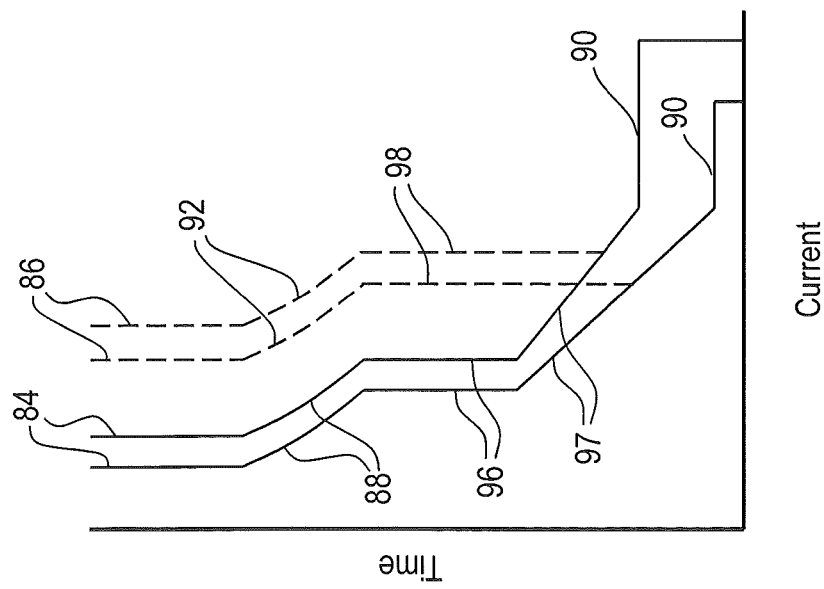
FIG. 4 is an illustration of an exemplary circuit breaker trip curve in unrestrained mode.
Figure 5:
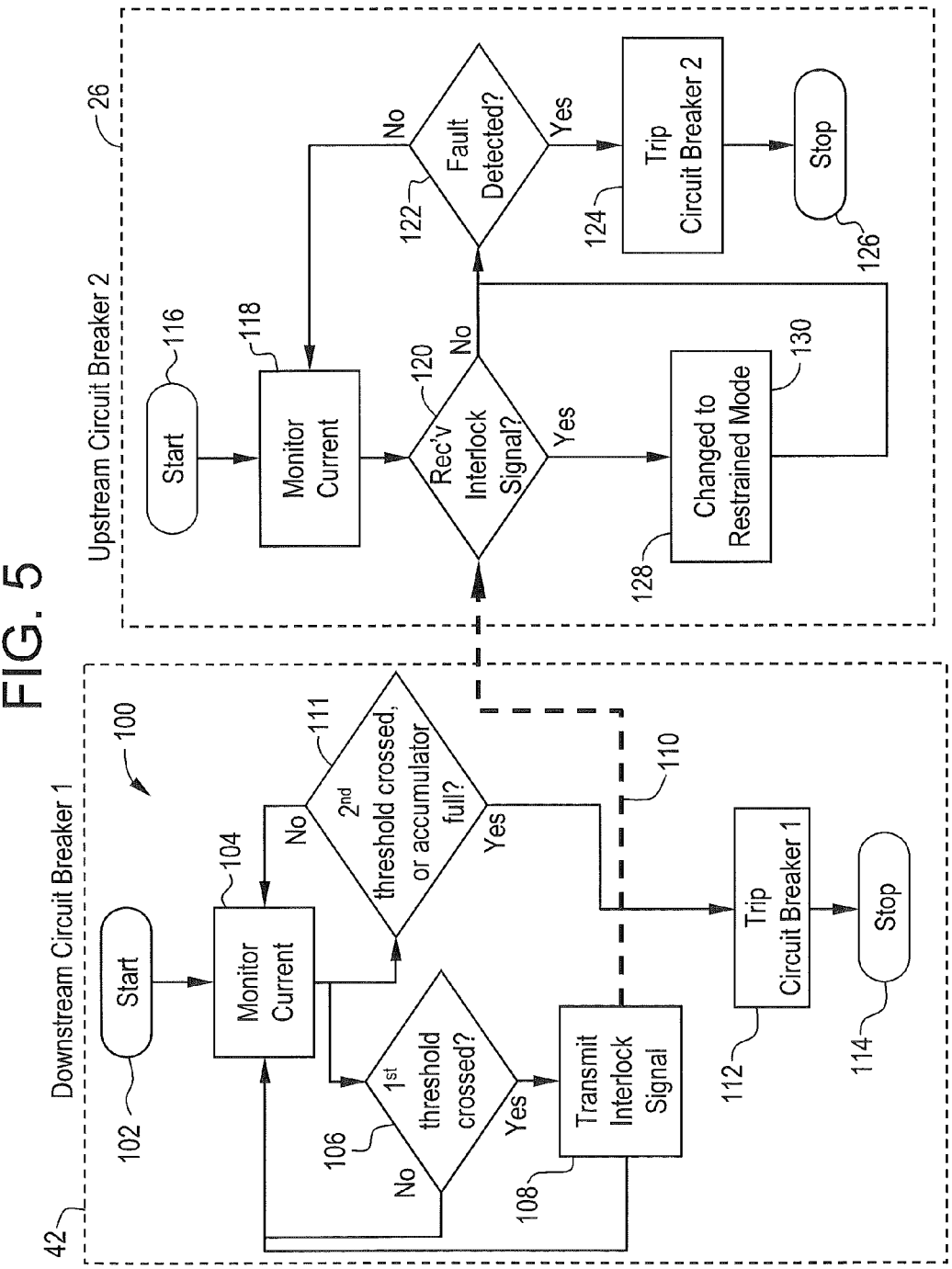
FIG. 5 is an illustration of an exemplary circuit breaker trip curve with the upstream circuit breaker in restrained mode.

As will be discussed below, the trip unit 48 monitors the condition of the electrical power flowing through the circuit breaker. The processor 50 compares electrical characteristics of the electrical current measured by current sensor 52 to predetermined parameters. In the exemplary embodiment, the predetermined parameters are a function of time and current level, as defined by one or more trip curves as illustrated in FIG. 4 and FIG. 5. In the event the electrical characteristics are outside the predetermined parameters, the processor activates the operating mechanism causing the contacts to open and interrupt electrical power into the protected circuit.

Similar to the ACB 26, the downstream lower tier MCCB's 42, 44 each include a trip unit 54 having a processor and a current sensor. The trip units 54 are arranged to monitor the electrical current flowing through the respective MCCB 42, 44 and into the lower tier sub-circuit 40. Each MCCB 42, 44 will further include a user interface (not shown) that allows the operator to monitor the condition of the MCCB 42, 44 and adjust user definable settings, such as a trip curve. The user interface of the MCCB 42, 44 may include a display and keyboard as with the ACB 26. Alternatively, the user interface of the MCCB 42, 44 may be a selector switch that allows the operator to select between different factory set parameters.

The trip units 48, 54 will be described in reference to FIG. 2. It should be appreciated that trip units 48, 54 may be differing substantially in construction, however, for exemplary purposes the trip units 48, 54 will be described in terms of their common functional components. The processor 50 is a suitable electronic device capable of accepting data and instructions, executing the instructions to process the data, and presenting the results, such as through user interface 46 for example. Processor 50 can be a microprocessor, microcomputer, a minicomputer, an optical computer, a board computer, a complex instruction set computer, an ASIC (application specific integrated circuit), a reduced instruction set computer (RISC), an analog computer, a digital computer, a molecular computer, a quantum computer, a cellular computer, a superconducting computer, a supercomputer, a solid-state computer, a single-board computer, a buffered computer, a computer network, a desktop computer, a laptop computer, or a hybrid of any of the foregoing.

Processor 50 is capable of converting the analog voltage or current level provided by current sensor 52 into a digital signal indicative of the level of electrical current flowing through conductor 56. Alternatively, current sensor 52 may be configured to provide a digital signal to processor 50, or an analog-to-digital (A/D) converter 58 maybe coupled between current sensor 52 and processor 50 to convert the analog signal provided by current sensor 52 into a digital signal for processing by processor 50. Processor 50 uses digital signals act as input to various processes for controlling the circuit breaker. The digital signals represent one or more system 20 data including but not limited to interlock signals, main contact position, closing spring position and the like.

Figure 2:
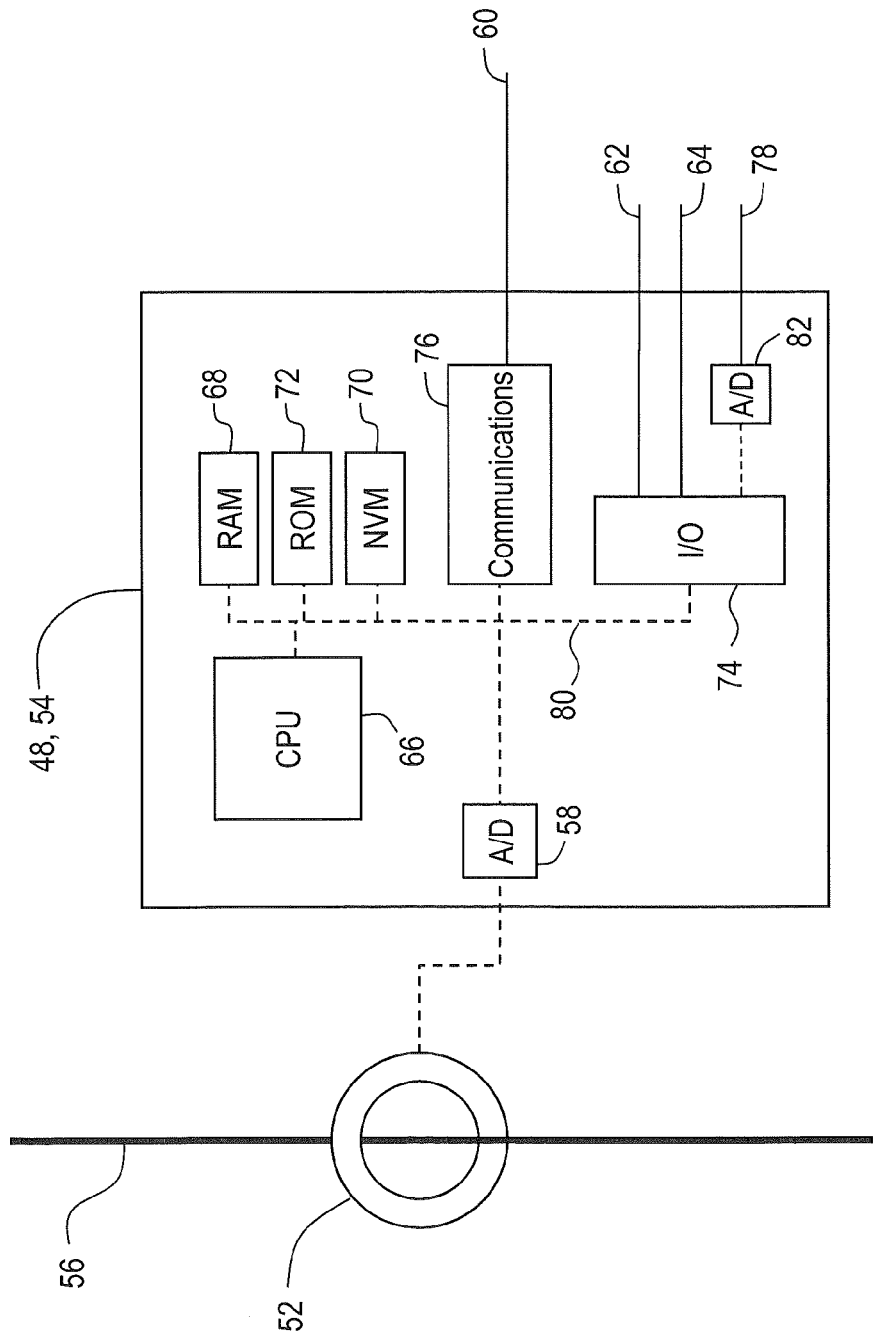
FIG. 2 is a schematic illustration of a circuit breaker trip unit in accordance with an exemplary embodiment.

It should be appreciated that while only one current sensor 52 and conductor 56 are illustrated in FIG. 2 and discussed herein, the circuit breakers 26, 42, 44 will typically have one such current sensor 52 for each electrical phase, or "pole" of the circuit breaker. Each pole of a circuit breaker carries electrical current for a single electrical phase. In a "multi-pole" circuit breaker, such as ACB 26 for example, the circuit breaker will have several poles, typically three or four, each carrying a different phase of electricity through the circuit breaker. Each of the poles is individually connected to the main contacts for each pole and its respective operating mechanism.

As will be discussed in more detail below, the processor 50 is operably coupled with one or more components of system 20 by data transmission media 60. Data transmission media 60 includes, but is not limited to, twisted pair wiring, coaxial cable, and fiber optic cable. Data transmission media 60 also includes, but is not limited to, wireless, radio and infrared signal transmission systems, using a protocol such as IEEE 802.11 for example. Data transmission media 60 may also include one or more data relays 61 that aggregate sections of data transmission media 60 to minimize the number of connections to the upstream circuit breaker trip units. In the embodiment shown in FIG. 1, transmission media 60 couples the ACB 26 to the lower tier circuit breakers 42, 44. Processor 50 is configured to provide operating signals and to receive data via data transmission media 60.

In general, processor 50 accepts data from current sensor 52, and is given certain instructions for the purpose of comparing the data from current sensor 52 to predetermined operational parameters. Processor 50 provides operating signals to actuation devices for the circuit breaker operating mechanism. Processor 50 may also accepts data from other sensors within the circuit breaker, indicating, for example, the position of the operating mechanism. The processor 50 compares the operational parameters to predetermined variances (e.g. current and time) and if the predetermined variance is exceeded, generates a signal that may be used to indicate an alarm to an operator or to activate the operating mechanism causing the main contacts to open. Additionally, the signal may initiate other control methods that adapt the operation of the system 20 such as coordinating the response between the downstream circuit breaker 42, 44 and the upstream circuit breaker, by switching between restrained and unrestrained modes of operations. For example, if a current sensor 52 in a MCCB 42 detects a current condition above a predetermined threshold, this may indicate a short circuit electrical fault condition. As will be described in more detail below, to prevent the upstream circuit breaker, such as ACB 26 for example, from tripping due to the detection of the same fault condition, the processor 50 of MCCB 42 may transmit an interlock signal to the upstream ACB 26 causing the ACB 26 to execute instructions that switches to a restrained mode of operation and prevents the interruption of electrical power to the entire facility 28. The data received from current sensor 52 may be displayed on a user interface 46 coupled to processor 50 via display conduits 62 and keyboard conduit 64.

In addition to being coupled to one or more components within system 20, processor 50 may also be coupled to external computer networks such as a local area network (LAN) and the Internet. The LAN interconnects one or more remote computers, which are configured to communicate with processor 50 using a well-known computer communications protocol such as TCP/IP (Transmission Control Protocol/Internet (˜) Protocol), RS-232, ModBus, and the like.

Referring now to FIG. 2, a schematic diagram of processor 50 is shown. Processor 50 includes a central processing unit or controller 66 coupled to a random access memory (RAM) device 68, a non-volatile memory (NVM) device 70, a read-only memory (ROM) device 72, one or more input/output (I/O) controllers 74 and data communications device 76 to interface with data transmission media 60.

I/O controllers 74 are coupled to sensors 78 that monitor the operation of the circuit breaker and the user interface 46 for providing digital data between these devices and data bus 80. I/O controllers 74 are also coupled to analog-to-digital (A/D) converters 82, which receive analog data signals from sensor 78.

Data communications device 76 provides for communication between processor 50 and data transmission media 60 in a data communications protocol supported by data transmission media 60. ROM device 70 stores an application code, e.g., main functionality firmware, including initializing parameters, and boot code, for controller 66. Application code also includes program instructions as shown in FIG. 4 for causing controller 66 to execute any circuit breaker operation control methods, including activating the circuit breaker operating mechanism, generating alarms, and delaying tripping in response to receiving an interlock signal.

NVM device 70 is any form of non-volatile memory such as an EPROM (Erasable Programmable Read Only Memory) chip, a disk drive, or the like. Stored in NVM device 70 are various operational parameters for the application code. The various operational parameters can be input to NVM device 70 either locally, using a keypad or alternatively a remote computer. It will be recognized that application code can be stored in NVM device 70 rather than ROM device 72.

Processor 50 includes operation control methods embodied in application code shown in FIG. 5. These methods are embodied in computer instructions written to be executed by controller 66, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, Visual C++, Java, ALGOL (algorithmic language), BASIC (beginners all-purpose symbolic instruction code), visual BASIC, ActiveX, PHP, Perl, HTML (HyperText Markup Language), and any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software.

Figure 3:
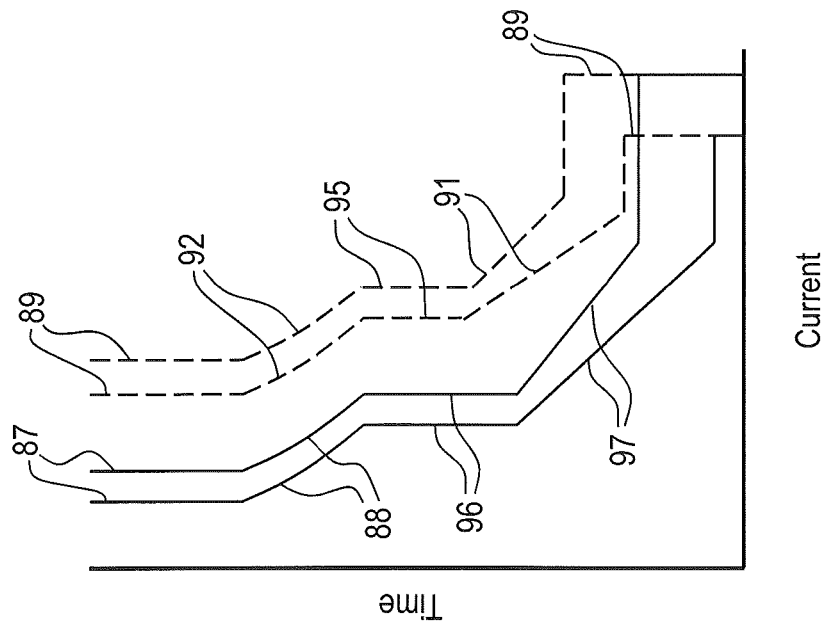
FIG. 3 is a flow chart illustration of the operation of a downstream circuit breaker and an upstream circuit breaker in accordance with an exemplary embodiment.

The NVM 70 in the trip units 48, 54 include data on parameters for the operation of the circuit breakers 26, 42, 44. This data includes unrestrained trip curves 84, 86 such as illustrated in FIG. 3 and restrained trip curves 87, 89 in FIG. 4. As will be discussed in more detail below, the trip curves for both the restrained and unrestrained modes of operation are user definable. These trip curves 84, 86, 87, 89 define a boundary between desired and undesired current levels as a function of time. For exemplary purposes herein, the trip curves 84, 87 represents the trip curve for a downstream circuit breaker, while the trip curves 86, 89 represents the trip curve for the upstream circuit breaker. A number of different types of fault conditions may occur in an electrical distribution system. As is well known in the art, the trip curves 84, 86 are graphically represented by a "band" or range that takes into account factors such as, but not limited to sensor tolerances and mechanical reaction times. One region, often referred to as an overload region 88, 92 or alternatively as a long time region, causes the circuit breaker 26, 42, 44 to trip if an elevated current level exists for too long a period of time. An overload may occur, if a number of devices, such as motors or compressors for example, start at the same time resulting in a transient elevation of the electrical current in the circuit. The curvature of the trip curve in the overload region is intended to allow the circuit breaker to maintain its functionality without undesired or "nuisance" tripping due to transient conditions. At a certain current level, commonly referred to as the short time pickup region 96, 98 the reaction time of the circuit breaker decreases due to higher fault levels that create the potential for damaging the wiring within the electrical distribution system. Further along the trip curve is a region commonly referred to as an instantaneous pickup region 90. Due to the magnitude of the fault, the circuit breaker will trip with little to no appreciable delay. The instantaneous region is intended to trip the circuit breaker when a high level fault, such as a short circuit condition for example, occurs. A final region of the trip curve is referred to as an "override" region (not shown). The purpose of the override region is to prevent damage to the circuit breaker. It should be appreciated that while FIG. 3 illustrates a single pair of trip curves, each of the circuit breakers 26, 42, 44 may have a different trip curves depending on the size of the circuit breaker and aspects of the circuits to which it is attached. Further, not all circuit breakers will incorporate all of the regions discussed above. For example, the override region is not utilized by all circuit breakers. The trip units 48, 54 may also detect other fault conditions, such as ground faults where there is an undesired amount of current flowing from the conductors to the neutral or ground.

In the exemplary embodiment, the circuit breakers 26, 42, 44 allow the operator to define trip curves 84, 86, 87, 89 for their particular application. The operation may change or define the trip curves 84, 86, 87, 89, or portions thereof, to provide advantages in allowing the operator to more precisely define the coordination between the ACB 26, the MCCB 42, and the MCCB 44. As illustrated in FIG. 4, the operator may modify the trip curves 87, 89 in the restrained mode of operation to enable the circuit breaker system to provide the desired performance, namely allowing the downstream circuit breaker to clear the fault. The operator may define a short time pickup threshold 95 and an instantaneous pickup threshold 89. The slope of the time delay or $I^2t$ region 91, 97 may also modified to further control the reaction time of the circuit breaker. In general, when the override region is provided, the parameter is not user definable and remains the same. As will be discussed in more detail below, the user defined trip curves 84, 86, 87, 89 also allows the operator to use a zone selective interlock system to allow the desired tripping response when a fault occurs in the electrical system.

An exemplary embodiment method for the coordination and zone selective interlock system between the circuit breakers will be described in reference to FIG. 5. It should be appreciated that while the description discusses the operation with reference to ACB 26 and MCCB 42, this is for exemplary purposes only. The same operation may also be applied between the MCCB 42 and MCCB 44, or ACB 26 and the MCCB 44 without deviating from the intended scope of the claimed invention.

The operation process 100 of trip unit 54 of downstream MCCB 42 starts in block 102 and proceeds to monitor the electrical current flowing through the MCCB 42 in block 104. Process 100 then proceeds to decision block 106 where it is determined if a first fault condition threshold has been crossed. The threshold that is compared against is user selectable. The threshold may be the root mean square ("RMS") value of the short time region 96. The threshold may also be based on a sample value in the instantaneous trip region 90. The threshold may also be based on ground fault or long time fault conditions. The user further has the option of selecting any of the above thresholds, such as the RMS short time value, or the instantaneous sample value for example. If either threshold parameter is satisfied, the decision block 106 provides an affirmative response.

If the threshold condition in the instantaneous region 90 is not detected, a negative response results in block 106. Thus the process 100 loops back to block 104 and continues monitoring the electrical current. It should be appreciated that the process 100 will also include steps for monitoring overload region 88, 92 type of faults as is well known in the art.

If an affirmative response is received in block 106, the process 100 moves on to block 108 where a selective interlock signal, represented by line 110, is immediately transmitted to upstream ACB 26 which will take further action as discussed below. After transmitting the signal, the process 100 proceeds to block 104 to continue monitoring the current.

In parallel with first threshold decision block 106, process 100 also compares the measured current values against a second criteria in block 111. Decision block 111 determines if the instantaneous region threshold 90 has been crossed, or if the "accumulator" for the short time region threshold 96 has been exceeded. Since the input current in the short time region 96 may vary, the short time trip algorithm uses an accumulator to determine the number of times the threshold has been crossed over a period of cycles. Once the accumulator has been filled, or if the instantaneous threshold has been crossed, decision block 111 returns an affirmative response and proceeds to block 112. In block 112 the trip unit 54 activates the operating mechanism of the MCCB 42 causing the main contacts to separate and the interruption of the electrical current downstream from MCCB 42. The process 100 stops at block 114 and awaits the operator taking corrective measures for clearing the detected fault condition. If decision block 111 returns a negative, the process 100 returns to block 104 and monitors the current.

The trip unit 48 of upstream circuit breaker, ACB 26 for example, operates independently of and in parallel with the trip unit 54 of MCCB 42. The process 116 of operating trip unit 48 begins in start block 118 and proceeds to query block 120 where it is determined if a selective interlock signal 110 has been received from downstream circuit breaker MCCB 42. In the exemplary embodiment, the selective interlock signal 110 is an interrupt on the controller 66 in the trip unit 48 of the upstream ACB 26. This allows the steps within process 116 that react to selective interlock signal 110 to quickly take priority within the operations of the ACB 26.

If decision block 120 results in a negative, the process 116 proceeds to decision block 122 where the controller 66 uses the unrestrained trip curves 86 to determine if a fault in the overload or instantaneous region has been detected. If decision block 120 results in a negative, the process 116 loops back to block 118 and continues to monitor the electrical current. If decision block 120 results in a positive, the ACB 26 activates its operating mechanism in block 124 resulting in the opening of the main contacts and the interruption of electrical current downstream from the ACB 26. The process 116 then stops in block 126 and awaits the operator taking corrective action.

If the selective interlock signal 110 is received, decision block 120 returns a positive response. The process 116 switches the operation of the ACB 26 to a restrained mode of operation. In the restrained mode of operation, the process 116 switches the trip curve of the upstream circuit breakers to those desired for restrained mode of operation, such as from curve 86 to trip curve 89 for example. The process 116 then proceeds on to block 122 and uses user-defined restrained mode trip curve 89 for determining if a fault is occurring.

It should be appreciated that while the shifting to user-defined trip curve 89 also has the effect of delaying the response of ACB 26 and allowing the downstream circuit breaker the opportunity to clear the fault. This is accomplished since the user defined short time region 95, the $I^2t$ time delay region 91 and the instantaneous region 89 do not overlap with the trip curve 87 of the downstream circuit breaker. After changing from the user defined unrestrained trip curve 86 to the user-defined restrained trip curve 89 in block 130, the process 116 loops back to query block 122. Here it is determined if a fault has been detected. This arrangement provides the advantage that in the event the downstream circuit breaker, MCCB 42, is unable to adequately clear the electrical fault, the upstream circuit breaker, ACB 26, can provide the electrical current interruption functionality. As described above, if the electrical fault is detected, the ACB operating mechanism is activated in block 124, the current interrupted and process 116 stops in block 126. If no electrical fault is detected, the process 116 loops back to monitor the current in block 118.

It should be appreciated that the processes 100, 116 may occur between any downstream circuit breaker and upstream circuit breaker. Further, a circuit breaker, such as MCCB 42, may be positioned in between the downstream breaker 44 and the ACB 26. In this embodiment, the MCCB 44 would issue the selective interlock signal 110 and both the MCCB 42 and the ACB 26 would follow process 116 and modify their operations accordingly.

Figure 6:
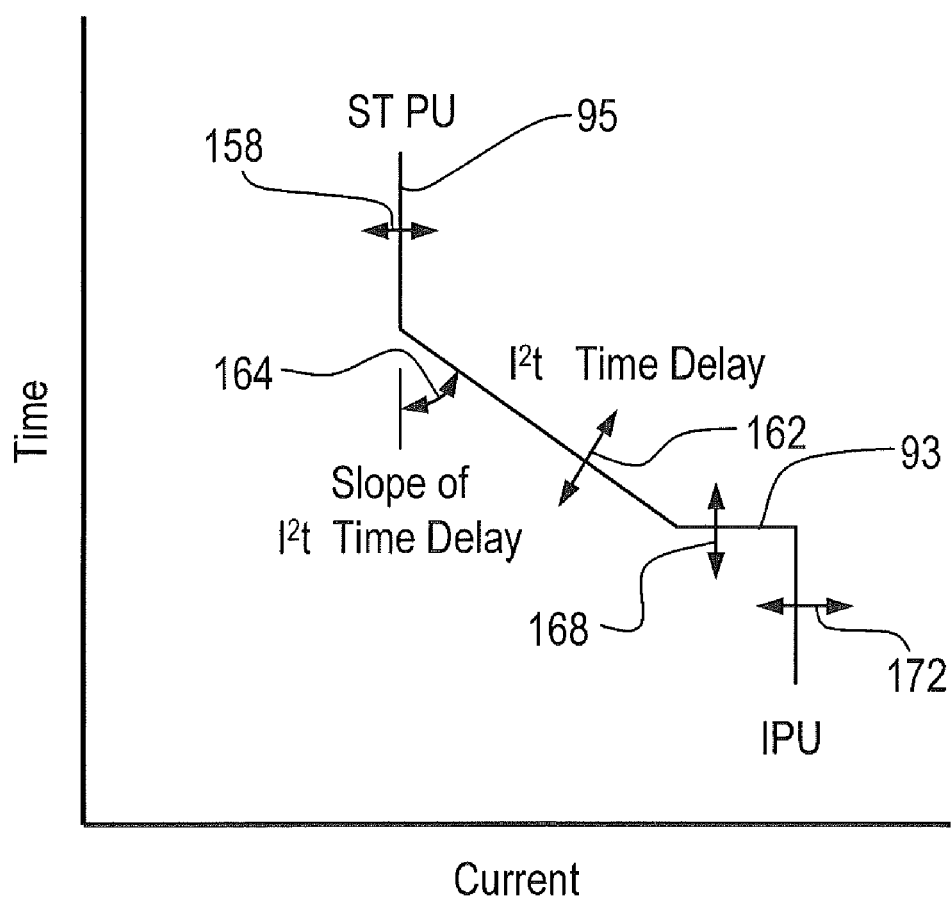
FIG. 6 is a schematic illustration of the user definable trip curve parameters.
Figure 7:
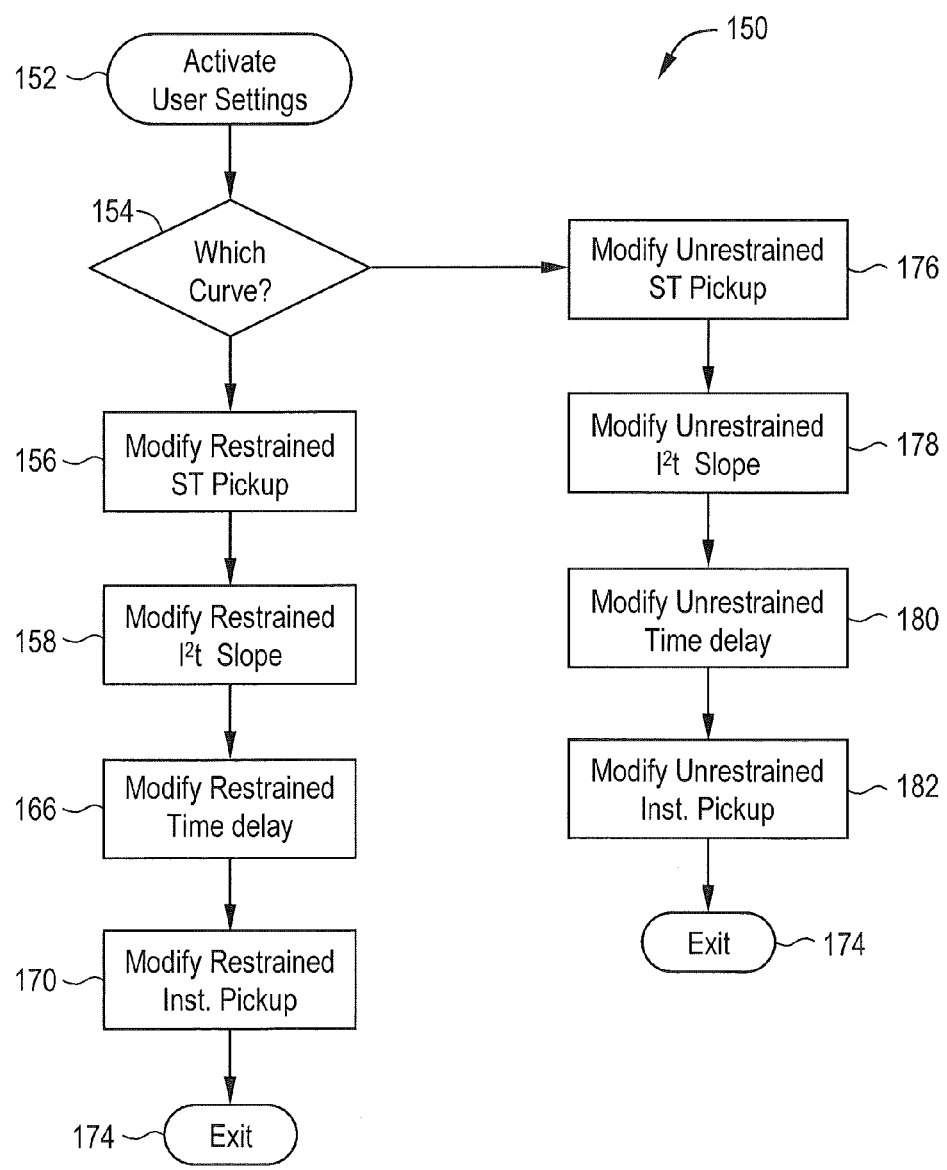
FIG. 7 is a flow chart illustration of the user-definable trip curve setting.

As discussed above, in the exemplary embodiment, the operator may define the parameters of both the unrestrained trip curve 84, 86 and the restrained trip curves 87, 89 to achieve the desired circuit breaker system response in the event of an electrical fault. With reference to FIG. 6 and FIG. 7, it is illustrated that the portions of the trip curve are fully definable. The process 150, starts in block 152 by the operator selecting the appropriate settings selection on the user interface 46. The activation of the settings selection allows the operator to define the different portions of the trip curves. First, the operator is allowed to select which curve they want to modify in decision block 154. If the operator wants to modify the restrained curve 89, the process 150 proceeds to block 156 where the operator is allowed to adjust the short time pickup threshold 95. The adjustment of the short time pickup threshold 95 is in the direction represented by arrow 158.

After adjusting the short time threshold, the process 150 proceeds to block 158 where the operator is allowed to adjust $I^2t$ time delay slope 91. This parameter may be adjusted in two directions, either the position as indicated by arrow 162, or the angle of the slope 164. After making the desired selection, the process 150 continues to block 166 where the operator is allowed to change time delay region 93. This parameter may be adjusted along the time axis of the trip curve as indicated by arrow 168. It should be appreciated that in some applications, the operator may not have or desire the time delay region 93, as illustrated in FIG. 4 for example.

Next the process 150 allows the operator to adjust the instantaneous threshold in block 170. The direction of this adjustment is indicated by arrow 172. Once all of the adjustments have been made by the operator, the process exits in block 174.

If the operator selected to modify the unrestrained trip curve 86 in block 154, the process 150 proceeds to block 176 where the operator is allowed to modify the unrestrained short time pickup threshold. The process 150 then proceeds in a similar manner as described above in reference to the restrained trip curve parameters. Thus the operator is able to modify the unrestrained I2t time delay in block 178, the unrestrained time delay in block 180, and the unrestrained instantaneous pickup threshold in block 182. Once the parameters have been modified, the process 150 exits at block 174.

Figure 8:
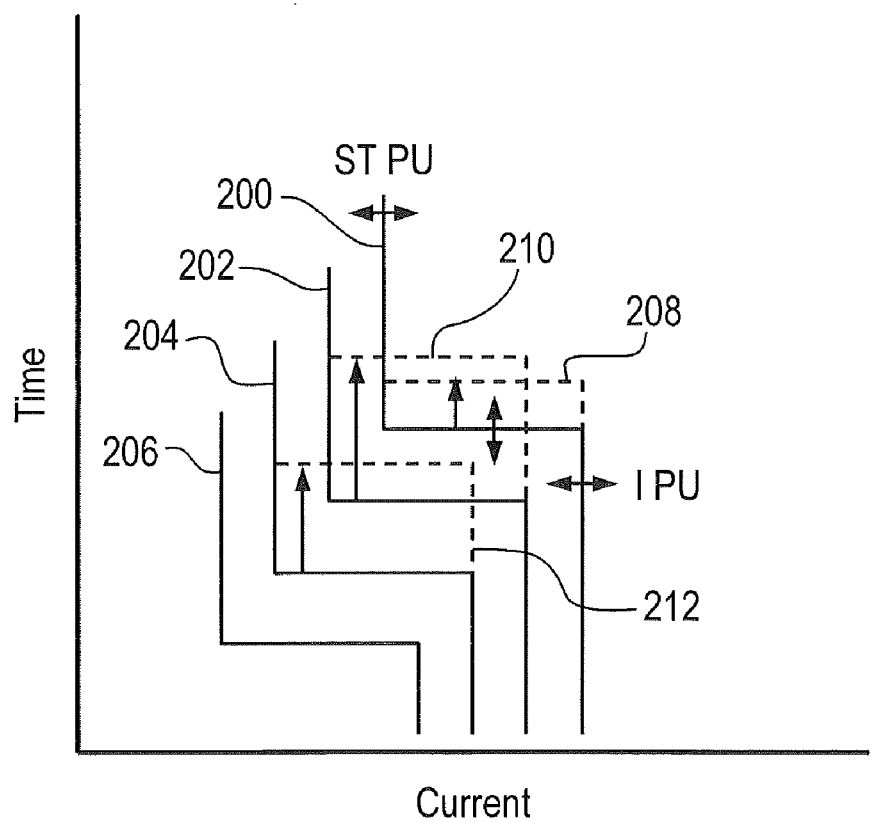
FIG. 8 is a partial schematic illustration of an exemplary embodiment trip curves of the circuit breakers in FIG. 1.

Turning now to FIG. 8, it can be seen that the ability to adjust both the restrained and unrestrained trip curves provides further advantages when more than two circuit breakers are arranged in a circuit breaker system. FIG. 8 illustrates the portion of the trip curves for a circuit breaker system having four circuit breakers arranged in series in a circuit. The unrestrained trip curves for each circuit breaker represented by the solid lines 200, 202, 204, 206. The restrained curves may be adjusted to allow the restrained curves, represented by dashed lines 208, 210, 212, to be below the respective unrestrained trip curve of the adjacent downstream circuit breaker. The flexibility of adjusting both the unrestrained and the restrained trip curves thus allows the operator to select which circuit breaker will trip in the system in the event of a higher level fault.

Figure 9:
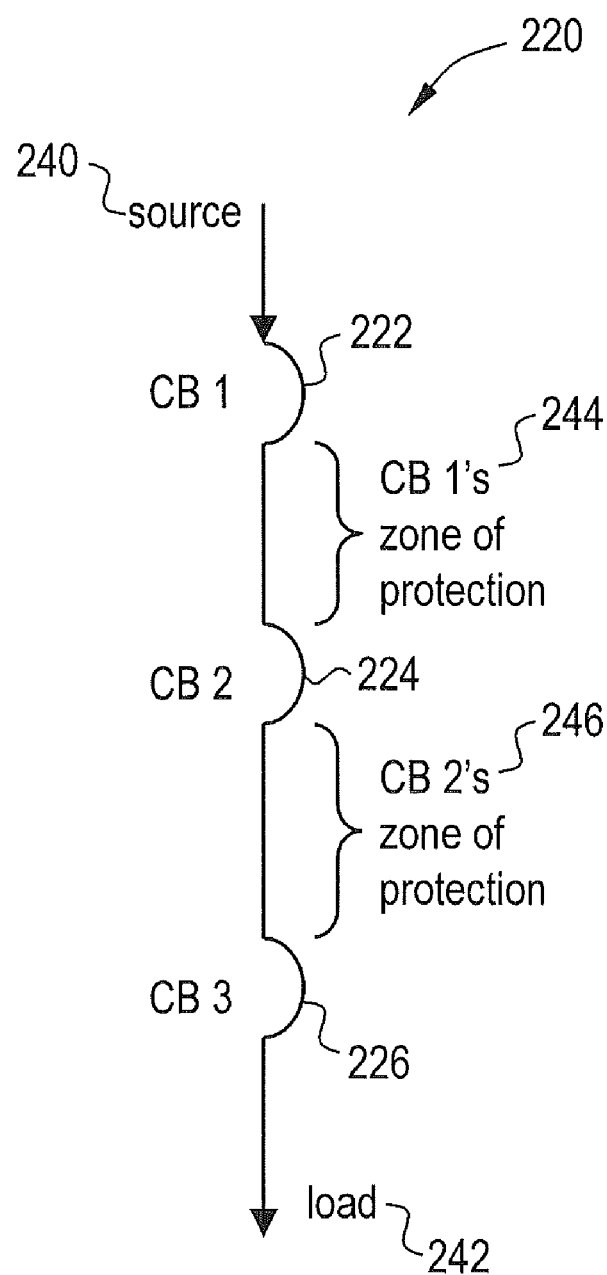
FIG. 9 is a schematic illustration of an alternate embodiment circuit breaker system.
Figure 10:
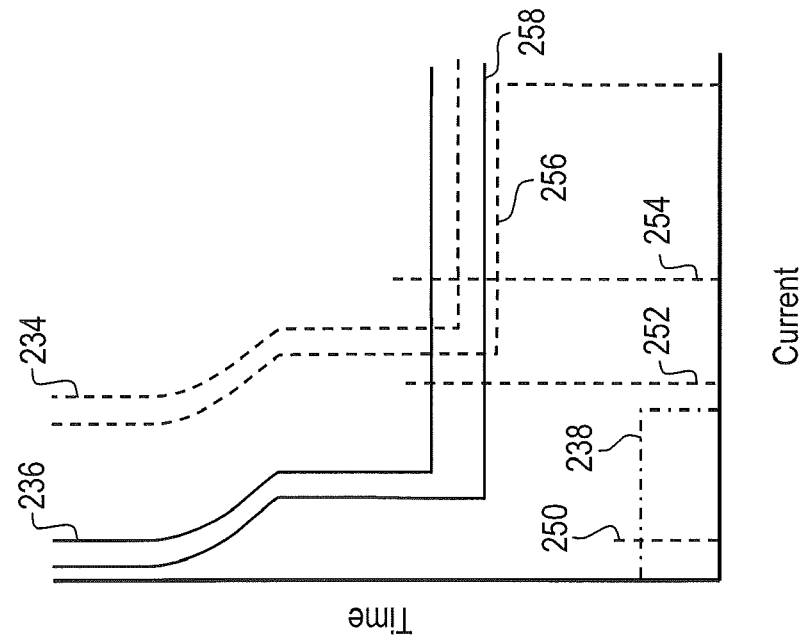
FIG. 10 is an illustration of a trip curve for the circuit breaker system of FIG. 9 in an unrestrained mode of operation; and, FIG. 11 is an illustration of a trip curve for the circuit breaker system of FIG. 9 in a restrained mode of operation.
Figure 11:
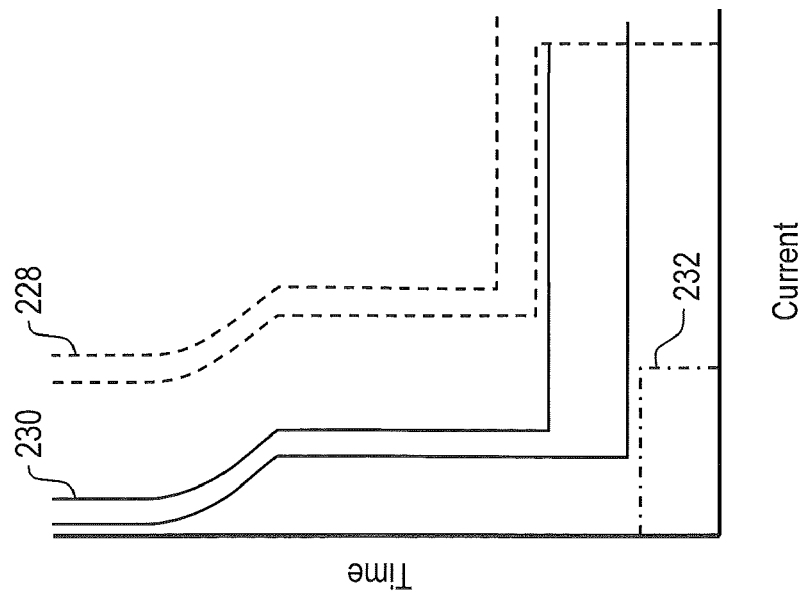

Another exemplary embodiment of a circuit breaker system 220 is illustrated in FIG. 9. The circuit breakers 222, 224, 226 are programmed to have the unrestrained trip curves 228, 230, 232 respectively as illustrated in FIG. 10 and restrained trip curves 234, 236, 238 respectively as illustrated in FIG. 11.

The circuit breaker system 220 is arranged between an electrical source 240 and a load 242.

In the unrestrained mode, the trip curves 228, 230, 232 are used by the circuit breakers 222, 224, 226 respectively, and if a fault occurs within one of the respective zones of protection 244, 246, the circuit beaker responsible for that zone, such as zone 244 and circuit breaker 222 for example, will clear the fault according to the unrestrained trip curve 228.

If a downstream circuit breaker, such as circuit breaker 226 for example, detects a fault, the interlock signal is transmitted to the upstream circuit breakers 222, 224. The upstream circuit breakers switch to a restrained trip curves 234, 236 as using the methods and systems described herein above. In some applications, the operator may desire to have the further upstream circuit breaker, such as circuit breaker 222 for example, trip under certain conditions before a intermediate circuit breaker, such as circuit breaker 224 for example. Since both the restrained and unrestrained trip curves may be user defined, and the unrestrained trip curve is not forced into the fastest default curve, the trip curve of the upstream circuit breaker may overlap with the intermediate circuit breaker while remaining interlocked.

For example, if a fault may occur at the load with a magnitude represented by line 250. In this situation, the downstream circuit breaker 226 clears the fault since the level of the fault was below the short time and instantaneous thresholds for circuit breakers 222, 224. However, if the level of the fault increases to that indicated by line 252, the level of the fault is above the capacity of the downstream circuit breaker 226 and thus the intermediate circuit breaker 224 clears the fault.

There may be circumstances when the operator desires to have the furthest upstream circuit breaker 222 clear the fault. When the restrained time delay region 256 of the circuit breaker 222 is lowered below the respective time delay region 258 of circuit breaker 224. Thus, circuit breaker 222 will clear the fault by interrupting the current before the intermediate circuit breaker 222. Accordingly, by allowing the user to define the respective trip curves, the operator may gain advantages and achieve the desired results for tripping response in the event of a fault over a wide range of conditions.

The capabilities of the embodiments disclosed herein can be implemented in software, firmware, hardware or some combination thereof. As one example, one or more aspects of the embodiments disclosed can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately. Additionally, at least one program storage device readable by a machine, tangibly embodying at least one program of instructions executable by the machine to perform the capabilities of the disclosed embodiments can be provided.

Further, the diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of operating a circuit breaker system comprising:
defining a first user defined trip curve for a first circuit breaker, said first trip curve having an unrestrained short time threshold, an unrestrained $I^2t$ region having a slope, a time delay region, and an unrestrained instantaneous threshold;
defining a second user defined trip curve for said first circuit breaker, said second trip curve having a restrained instantaneous threshold and a restrained $I^2t$ region having a slope, and a time delay, said second user defined trip curve being noncontiguous with and non-overlapping with said first user defined trip curve, wherein the second user defined trip curve has at least one of said restrained instantaneous threshold or said $I^2t$ region at higher operating level than said first user defined trip curve unrestrained instantaneous threshold or said unrestrained $I^2t$ region;
creating a third user defined trip curve for a second circuit breaker wherein said second circuit breaker is coupled to receive electrical power from said first circuit breaker, said third trip curve having an $I^2t$ region having a slope, a time delay region and an instantaneous threshold, wherein said third user defined trip curve is non-overlapping with said second user defined trip curve;
modifying said second user defined trip curve restrained instantaneous threshold and said slope of said second user defined second trip curve restrained $I^2t$ region, wherein said modified slope of said second trip curve restrained $I^2t$ region and said restrained instantaneous threshold are at a higher operating level than said third trip curve $I^2t$ region and said third trip curve instantaneous threshold;
receiving an interlock signal at said first circuit breaker from said second circuit breaker; and,
changing a trip response of said first circuit breaker from said first trip curve to said second trip curve in response to receiving said interlock signal.

2. The method of claim 1 further comprising:
monitoring electrical current with said second circuit breaker;
detecting if a fault threshold has been violated with said second circuit breaker; and
transmitting said interlock signal from said second circuit breaker to said first circuit breaker if a fault threshold has been violated.

3. The method of claim 2 wherein said fault threshold is selected from a group consisting of: long time threshold, short time threshold, instantaneous threshold and ground fault threshold.

4. The method of claim 3 further comprising:
modifying said user defined second trip curve restrained time delay region, wherein said second trip curve restrained time delay region has a lower time value than said third trip curve time delay region.

5. The method of claim 3 further comprising:
modifying said user defined third trip curve unrestrained time delay region, wherein said third trip curve time delay region has a higher time value than said second trip curve restrained time delay region.

6. The method of claim 2 further comprising modifying said user defined first trip curve unrestrained short time threshold, said unrestrained $I^2t$ region, said time delay region and said unrestrained instantaneous threshold.

7. The method of claim 6 further comprising modifying said user defined third trip curve unrestrained short time threshold, said unrestrained $I^2t$ region, said time delay region and said unrestrained instantaneous threshold.

8. A circuit breaker configured to be arranged in series with a downstream circuit breaker, the downstream circuit breaker having a trip curve with an $I^2t$ region and an instantaneous threshold, the circuit breaker comprising:
   a current sensor;
   a trip unit operably coupled to said current sensor, said trip unit responsive to executable computer instructions to operate in an unrestricted mode and is further responsive to executable computer instructions to operate in a restricted mode in response to an interlock signal;
   a user interface operably coupled to said trip unit;
   wherein said trip unit is further responsive to executable computer instructions to a first signal from said user interface to create a first user defined trip curve for use with said unrestricted mode and a second user defined trip curve for use with said restricted mode, wherein said first user defined trip curve and said second user defined trip curve are noncontiguous and non-overlapping, and wherein the restricted mode has a user defined $I^2t$ region and a user defined instantaneous threshold that is at a higher level non-overlapping with said downstream circuit breaker trip curve.

9. The circuit breaker of claim 8 wherein said trip unit is further responsive to a second signal from said user interface to modify parameters of said first user defined trip curve.

10. The circuit breaker of claim 9 wherein said first user defined trip curve parameters are chosen from a group consisting of: long time threshold, ground fault threshold, short time threshold, time delay region, and instantaneous threshold.

11. The circuit breaker of claim 8 wherein said trip unit is further responsive to a third signal from said user interface to modify parameters of said second user defined trip curve.

12. The circuit breaker of claim 11 wherein said second user defined trip curve parameters are chosen from a group consisting of long time threshold, ground fault threshold, short time threshold, time delay region, and instantaneous threshold.

13. A circuit breaker system comprising:
   a first circuit breaker comprising:
   a first trip unit, said first trip unit responsive to executable computer instructions to operate in either an unrestrained mode or a restrained mode, wherein said unrestrained mode includes a first trip curve and said restrained mode includes a second trip curve, said first trip curve and said second trip curve being noncontiguous and non-overlapping, said second trip curve having an $I^2t$ region and an instantaneous threshold, wherein said second trip curve is at a higher operating level than said first trip curve;
   a first current sensor electrically coupled to said first trip unit;
   a first user interface operably coupled to said first trip unit, wherein said first trip unit is response to executable computer instructions to modify parameters of said second trip curve $I^2t$ region and an instantaneous threshold in response to a first signal from said first user interface;
   a second circuit breaker electrically coupled to receive electrical power from said first circuit breaker, said second circuit breaker comprising
   a second trip unit, said second trip unit coupled for communication to said first trip unit, wherein said second trip unit is responsive to executable computer instructions to operate in either a restrained mode or an unrestrained mode, wherein said unrestrained mode includes a third trip curve having an $I^2t$ region and an instantaneous threshold that are at a lower operating level and non-overlapping with said second trip curve $I^2t$ region and instantaneous threshold;
   a second current sensor electrically coupled to said second trip unit;
   a second user interface operably coupled to said second trip unit, wherein said second trip unit in response to executable computer instructions to modify parameters of said third trip curve in response to a second signal from said second user interface;
   wherein said second trip unit is further responsive to executable computer instructions to transmit an interlock signal to said first trip unit in response to a signal from said second current sensor indicating a fault condition threshold has been exceeded, wherein said fault condition threshold is defined by said third trip curve; and,
   wherein said first trip unit is further responsive to executable computer instructions to switch from said unrestrained mode to said restrained mode in response to receiving said interlock signal.

14. The circuit breaker system of claim 13 wherein said first trip unit is further responsive to executable computer instructions to modify parameters of said second trip curve in response to a third signal from said first user interface.

15. The circuit breaker system of claim 14 wherein said restrained mode includes a fourth trip curve and said second trip unit is further responsive to executable computer instructions to modify parameters of said fourth trip curve in response to a fourth signal from said second user interface.

16. The circuit breaker system of claim 13 wherein said first trip curve parameters are chosen from a group consisting of: long time threshold, ground fault threshold, short time threshold, and instantaneous threshold.

17. The circuit breaker system of claim 13 wherein said third trip curve parameters are chosen from a group consisting of long time threshold, ground fault threshold, short time threshold, and instantaneous threshold.

18. The circuit breaker system of claim 15 wherein:
   said second trip curve parameters are chosen from a group consisting of long time threshold, ground fault threshold, short time threshold, and instantaneous threshold; and
   said fourth trip curve parameters are chosen from a group consisting of long time threshold, ground fault threshold, short time threshold, and instantaneous threshold.

19. A method of operating a circuit breaker system comprising:
   defining a first user defined trip curve for a first circuit breaker;
   defining a second user defined trip curve for said first circuit breaker, said second user defined trip curve being noncontiguous with and non-overlapping with the first user defined trip curve, wherein the second user defined trip curve has at least one of a restrained instantaneous threshold or a restrained $I^2t$ region at higher operating level than said first user defined trip curve;

creating a third user defined trip curve for a second circuit breaker wherein said second circuit breaker is coupled to receive electrical power from said first circuit breaker, said third trip curve having an $I^2t$ region having a slope, a time delay region and an instantaneous threshold, wherein said third trip curve is noncontiguous and non-overlapping with said second user defined trip curve;

modifying said second user defined trip curve restrained instantaneous threshold and said second user defined second trip curve restrained $I^2t$ region, wherein said modified second user defined second trip curve restrained $I^2t$ region and said restrained instantaneous threshold are at a higher operating level than said third trip curve $I^2t$ region and said third trip curve instantaneous threshold;

receiving an interlock signal at said first circuit breaker from said second circuit breaker; and, changing a trip response of said first circuit breaker from said first trip curve to said second trip curve in response to receiving said interlock signal.

* * * * *